United States Patent
Champlin-Scharff et al.

(10) Patent No.: US 9,720,815 B2
(45) Date of Patent: *Aug. 1, 2017

(54) AUTOMATICALLY GENERATING TESTCASES

(71) Applicant: INTERNATIONAL BUSINESS MACHINES CORPORATION, Armonk, NY (US)

(72) Inventors: George H. Champlin-Scharff, Reading, MA (US); Derek M. Reedy, Ayer, MA (US); Timothy B. Snow, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/081,856

(22) Filed: Mar. 26, 2016

(65) Prior Publication Data

US 2016/0210225 A1    Jul. 21, 2016

Related U.S. Application Data

(63) Continuation of application No. 14/573,441, filed on Dec. 17, 2014, now Pat. No. 9,471,471.

(51) Int. Cl.
*G06F 9/44* (2006.01)
*G06F 11/36* (2006.01)
(Continued)

(52) U.S. Cl.
CPC .......... *G06F 11/3684* (2013.01); *G06F 11/22* (2013.01); *G06F 17/271* (2013.01); *G06F 17/277* (2013.01); *G06F 17/28* (2013.01)

(58) Field of Classification Search
None
See application file for complete search history.

(56) References Cited

U.S. PATENT DOCUMENTS

| | | | | |
|---|---|---|---|---|
| 5,856,984 A | * | 1/1999 | Rushworth | G06F 11/2257 714/724 |
| 2010/0058114 A1 | * | 3/2010 | Perkins | G06Q 10/06 714/39 |

(Continued)

OTHER PUBLICATIONS

Schnelte, "Generating Test Cases for Times Systems from Controlled Natural Language Specifications", Third IEEE International Conference on Secure Software Integration and Reliability Improvement, 2009, pp. 348-353.*

(Continued)

*Primary Examiner* — H S Sough
*Assistant Examiner* — Timothy Duncan
(74) *Attorney, Agent, or Firm* — Michael R. Long; Diana L. Roberts (57) ABSTRACT

A technique for generating testcases includes receiving a new product specification for an application. A noun-verb pairing is performed on the new product specification. An attempt is made to locate a similar noun-verb pairing in a previous product specification for the application that corresponds to the new noun-verb pairing. In response to locating the similar noun-verb pairing in the previous product specification, a new testcase is generated by modifying an existing testcase that is associated with the similar noun-verb pairing in the previous product specification. In response to not locating the similar noun-verb pairing in the previous product specification, the fact that the new testcase was not generated is indicated.

6 Claims, 6 Drawing Sheets

(51) Int. Cl.
*G06F 17/28* (2006.01)
*G06F 17/27* (2006.01)
*G06F 11/22* (2006.01)

(56) References Cited

U.S. PATENT DOCUMENTS

| | | | |
|---|---|---|---|
| 2012/0272206 A1* | 10/2012 | Sengupta | G06F 17/2705 717/101 |
| 2013/0185056 A1* | 7/2013 | Ingram | G06F 11/3684 704/9 |
| 2013/0263089 A1 | 10/2013 | Banerjee et al. | |
| 2014/0059522 A1* | 2/2014 | Chandra | G06F 11/3684 717/126 |
| 2014/0108410 A1 | 4/2014 | Iwama et al. | |
| 2015/0227452 A1* | 8/2015 | Raghavan | G06F 11/3684 717/124 |

OTHER PUBLICATIONS

Cunning et al., "Test Scenario Generation from a Structured Requirements Specification", Proceedings of the 1999 IEEE Conference on Engineering of COmputer-based systems, pp. 166-172.*
Chen et al., "Specification-based Regression Test Selection with Risk Analysis", Proceedings of the 2002 Conference of the Centre for Advanced Studies on Collaborative REsearch (CASCON '02), pp. 1-14.*
George H. Champlin-Scharff, "Automatically Generating Testcases," U.S. Appl. No. 14/573,441, filed Dec. 17, 2014—Notice of Allowance dated Jun. 28, 2016.

* cited by examiner

AUTOMATICALLY GENERATING TESTCASES

BACKGROUND

The present disclosure is generally directed to data processing and more particularly to testcases. Still more particularly, the present disclosure is directed to techniques for automatically generating new testcases for testing a software system from existing testcases based on noun-verb pairings.

Watson was originally designed as a question answering (QA) system (i.e., a data processing system) that applied advanced natural language processing, information retrieval, knowledge representation, automated reasoning, and machine learning technologies to the field of open domain question answering. In general, document search technology receives a keyword query and returns a list of documents, ranked in order of relevance to the query (often based on popularity and page ranking). In contrast, QA technology receives a question expressed in natural language, seeks to understand the question in greater detail than document search technology, and returns a precise answer to the question.

The original Watson system reportedly employed more than one-hundred different algorithms to analyze natural language, identify sources, find and generate hypotheses, find and score evidence, and merge and rank hypotheses. The original Watson system implemented DeepQA™ software and the Apache™ unstructured information management architecture (UIMA) framework. Software for the original Watson system was written in various languages, including Java, C++, and Prolog, and runs on the SUSE™ Linux Enterprise Server 11 operating system using the Apache Hadoop™ framework to provide distributed computing. As is known, Apache Hadoop is an open-source software framework for storage and large-scale processing of datasets on clusters of commodity hardware.

The original Watson system employed DeepQA software to generate hypotheses, gather evidence (data), and analyze the gathered data. The original Watson system was workload optimized and integrated massively parallel POWER7® processors. The original Watson system included a cluster of ninety IBM Power 750 servers, each of which includes a 3.5 GHz POWER7 eight core processor, with four threads per core. In total, the original Watson system had 2,880 POWER7 processor cores and 16 terabytes of random access memory (RAM). Reportedly, the original Watson system could process 500 gigabytes, the equivalent of a million books, per second. Sources of information for the original Watson system included encyclopedias, dictionaries, thesauri, newswire articles, and literary works. The original Watson system also used databases, taxonomies, and ontologies.

In software engineering, a testcase is a set of conditions or variables under which a tester determines whether an application or software system (or a feature of the application or the software system) functions as designed. Testcases are often referred to as test scripts or test automation code and are usually collected into test suites. A test oracle (e.g., a requirement, a use case, or a heuristic) provides a mechanism for determining whether an application or software system has passed or failed a test. Many different testcases may be employed to determine whether an application or software system is sufficiently tested prior to release.

In order to fully test that all application requirements are met, usually at least two testcases (i.e., a positive test and a negative test) are needed for each requirement. If a requirement has sub-requirements, each sub-requirement must also usually have at least two testcases. Tracking a link between a requirement and a test is frequently performed using a traceability matrix. Written testcases usually include a description of the functionality to be tested and the preparation required to ensure that the test can be conducted. A formal written testcase is characterized by a known input and by a predetermined expected output. The known input usually tests a precondition and the expected output usually tests a post-condition.

For applications or software systems without formal requirements, testcases can be written based on accepted normal operation of programs of a similar class. In certain instances, testcases are not written but activities and results are reported after tests have been executed. In scenario testing, scenarios or hypothetical stories are used to aid a tester in thinking through a complex problem. Scenarios may be as simple as a diagram for a testing environment or a description written in prose. Scenarios are usually different from testcases in that testcases are usually single steps while scenarios may cover a number of steps.

Machine learning is a scientific discipline that deals with the construction and study of algorithms that learn from data. Machine learning algorithms operate by building a model based on inputs and using the model to make predictions or decisions, as contrasted with only following explicit program instructions. Machine learning has been employed in various computing tasks, e.g., where designing and programming explicit, rule-based algorithms are not practical. Machine learning tasks may be supervised or unsupervised. In supervised learning a data processing system may be presented with example inputs and associated desired outputs with the goal of learning a general rule that maps inputs to outputs. Spam filtering is one example of supervised learning (in particular, classification), where a learning algorithm is presented with email (or other) messages labeled as 'spam' or 'not spam' to produce a program that independently determines whether subsequent messages are spam. In unsupervised learning, a learning algorithm learns on its own without a so-called 'trainer'. Unsupervised learning can be a goal in itself (discovering hidden patterns in data) or a means towards an end. Topic modeling is one example of unsupervised learning, where a program is given a list of human language documents and is tasked to determine which documents cover similar topics.

BRIEF SUMMARY

Disclosed are a method, a data processing system, and a computer program product (embodied in a computer-readable storage device) for automatically generating new testcases from existing testcases based on noun-verb pairings.

A technique for generating testcases includes receiving a new product specification for an application. A noun-verb pairing is performed on the new product specification. An attempt is made to locate a similar noun-verb pairing in a previous product specification for the application that corresponds to the new noun-verb pairing. In response to locating the similar noun-verb pairing in the previous product specification, a new testcase is generated by modifying an existing testcase that is associated with the similar noun-verb pairing in the previous product specification. In response to not locating the similar noun-verb pairing in the previous product specification, the fact that the new testcase was not generated is indicated.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a data processing system, and a computer program product (embodied in a computer-readable storage device) for automatically generating new testcases from existing testcases based on noun-verb pairings.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices. As used herein, the terms 'data' and 'evidence' are interchangeable. As may be used herein, the terms 'testcase', 'test code', and 'test automation code' are interchangeable.

Traditionally, testers have spent considerable time creating test automation code (i.e., testcases) to test software. Graphical user interface (GUI) testing is one example in which a great deal of time has been spent creating and maintaining testcases, often requiring very specialized expertise. Automation recorders are one approach that has been used to reduce the time spent creating testcases for GUIs. Unfortunately, automation recorders typically produce code that requires renewed attention with each new feature or slight alteration to a GUI. According to the present disclosure, new testcases may be created by extending already existing test automation code. In various embodiments, new testcases are generated using logic from existing testcases that is modified based on new specifications for new features that require testing. The disclosed techniques generate new testcases by extending test automation code coverage with reduced or no additional manual effort.

According to one aspect of the present disclosure, machine learning is employed to facilitate the automatic generation of new testcases. In various embodiments, specifications for an existing product and testcases used to test features of the existing product are loaded into an automated testcase generation system that executes a machine learning application. In one or more embodiments, the testcase system is configured to extract noun-verb pairings from specifications of an existing product using standard natural language processing (NLP) techniques. Existing testcases are then matched with respective noun-verb pairings (during a training process) by a machine learning application to produce a classification model (classifier). When a new feature is added to a product, specifications for the new feature are provided as input to the classifier, and the classifier is configured to create a new testcase by adapting one or more existing testcases (associated with the existing product specifications) with similar features. The approach generally reduces the overall manual effort required to extend testcase coverage or repair testcases whose features have changed.

Conventionally, the Watson system has explored large amounts of structured and unstructured data to find candidate answers for a question (or a problem). According to various embodiments of the present disclosure, a Watson system may be modified to receive input other than questions. For example, in one or more embodiments, a Watson system is modified to receive original product specifications and related original testcases. Upon receipt of the original product specifications and the related original testcases, the modified Watson system is configured to match noun-verb pairings in the original product specifications with the related original testcases. A classifier of the modified Watson system is then trained on the matched noun-verb pairings and related original testcases. When one or more new product specifications are received by the modified Watson system, noun-verb pairings in the new product specifications are matched with similar noun-verb pairings in the original product specifications. The modified Watson system then generates new testcases from the original testcases that are associated with the similar noun-verb pairings (e.g., by substituting nouns and verbs from noun-verb pairings in the new product specifications for nouns and verbs associated with appropriate ones of the original testcases and/or by combing multiple ones of the original testcases to generate new testcases). While the various techniques are described herein as being implemented in a modified Watson system, it is contemplated that the disclosed techniques may be implemented in any cognitive NLP system.

As noted above, a data processing system configured to build new testcases loads specifications (and related testcases) associated with a product and creates noun-verb pairings for the specifications. The creation of noun-verb pairings typically involves parsing natural language of the information and pairing 'nouns' (e.g., 'radio button', 'dialog box', or 'alert message') with associated 'verbs' (e.g., 'click on', 'drag', or 'delete') in a conventional manner. In various embodiments, the information is representative of its purpose, i.e., the information encompasses the breadth, if not the specific detail, of the kinds of automation tasks for which test automation code is to be generated. For example, if the software is configured to generate test automation code for clicking (verb) on buttons (noun), then examples of buttons and clicking should usually exist within the load specifications in some form. It should be noted, however, the nouns and verbs do not necessarily have to be already associated in the specifications and do not necessarily have to be exact matches (e.g., nouns and verbs may correspond to synonyms and/or nouns and verbs may be singular or plural).

According to the present disclosure, subsequent to product specification generation, machine learning models are trained to generalize the knowledge stored within the product specifications. In a typical implementation, the software is fed a 'ground truth' (i.e., a set of pairings between specification functionality and automation test code that validates the functionality). In at least one embodiment, the 'ground truth' is manually maintained training data for the machine learning application. The 'ground truth' includes a mapping between automation test code and noun-verb pairings included in product specifications and can be extracted from known valid testing repositories, e.g., Git™ version control system or Rational Team Concert™ (RTC) work items and associated change sets. The data processing system then runs standard machine learning classification algorithms to train models that use the features extracted from the specification to select the most relevant test automation code (modeled as a dependent variable using any of a plurality of machine learning mechanisms, e.g., Bayesian classification) when presented with noun-verb pairings from a new specification.

As described above, noun-verb pairings are used in combination with existing testcases to produce new testcases. Using conventional natural language processing (NLP) techniques, loaded specifications are disassembled into component nouns and verbs that are used to locate potential matches. A solution is selected, based on the models generated, to serve as a template for final test automation code. Using the nouns and verbs isolated by the NLP analysis, a 'template' code (i.e., an existing testcase that has similar functionality to the desired functionality) is adjusted to fit the new specifications.

As one example, assume a 'Search Feature' in a product is being tested, a testcase for a simple search is already coded for an original product specification, and a new feature for 'Categorized Search' is being added that allows a user to select a search target from a drop-down list of available categories (e.g., 'Blogs', 'Activities', 'Mail', etc.) to constrain a search. Further, assume a repository of test automation code and specifications from various past projects are available that include tests of various features across various kinds of software (including different kinds of 'Search Features', as well as other features that use drop-downs, select links, verify pages, etc.). According to an embodiment of the present disclosure, the information is loaded into the system with the repository of test automation code and the specifications being stored in an internal representation of noun-verb pairings (e.g., 'click on', 'Search button', and 'select text from drop down' and 'select text from combo box'). Implementing standard NLP techniques, similar terms, such as 'select' & 'pick' and 'drop down' & 'combo box' may be associated while distinguishing 'selecting text from drop down' and 'clicking' on a link. A training set of samples of the test automation code with the associated specifications may then be created.

For example, assume a project in the repository has a feature that uses a drop-down menu to select filters for spreadsheet-style data and another project that allows a user to 'search' a document for string-matches. These features also have automation test code and specifications that can be mapped. In this case, a training set is built by pairing the specification for the filter selection feature with the test automation code for the filter selection feature. Following training of the model on the training set, a new specification that includes a new feature for a current project is loaded into the system. The new specification is then searched and analyzed and new test automation code is generated by modifying old test automation code that has similar nouns and verbs (in its associated specification) to include the new nouns and verbs that define a new project. By reviewing the existing test automation code base, the system may ascertain how to 'search' (a verb) and 'select' (a verb) from a 'Drop-Down List' (a noun). In general, modern automation tools facilitate querying applications under test and dynamically performing an action. In various embodiments, test automation code that performs an action is matched with language used to describe the action. For example, in the case of a drop down list, the verb 'select' and which element to select is translated into test automation code such that an automation tool may dynamically search for the element and select the element. In this case, when a new specification that involves 'selecting' from a 'drop-down list' to 'search', existing test automation code that is already associated with known nouns and verbs is used to create new test automation code that tests a new feature in the new specification.

Figure 1:
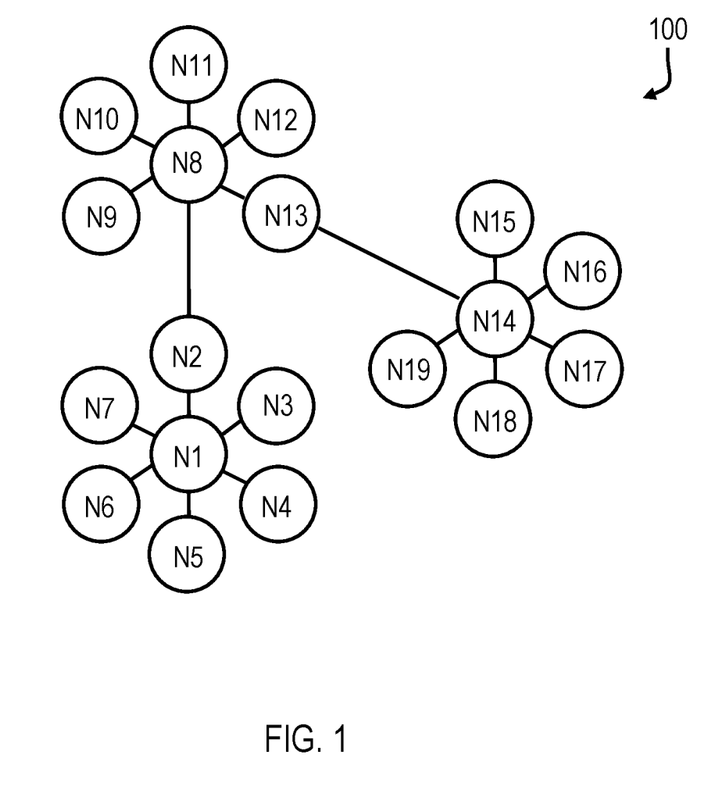
FIG. 1 is a diagram of an exemplary high performance computing (HPC) cluster that includes a number of nodes, with one or more of the nodes including multiple processors that are configured to automatically generate testcases from existing testcases based on noun-verb pairings according to one or more aspects of the present disclosure.

According to various aspects of the present disclosure, techniques for performing high performance computing (HPC) or network computing (using one or more nodes) is described herein that advantageously automatically generates new testcases from existing testcases based on noun-verb pairings. As used herein, a 'node' may include one or more symmetric multiprocessors (SMPs). With reference to FIG. 1, an example topology for a relevant portion of an exemplary HPC cluster (supercomputer) 100 includes a number of nodes (N1-N18) that are connected in, for example, a three-dimensional (3D) Torus topology. While eighteen nodes are illustrated in FIG. 1, it should be appreciated that more or less than eighteen nodes may be present in an HPC cluster configured according to the present disclosure.

Figure 2:
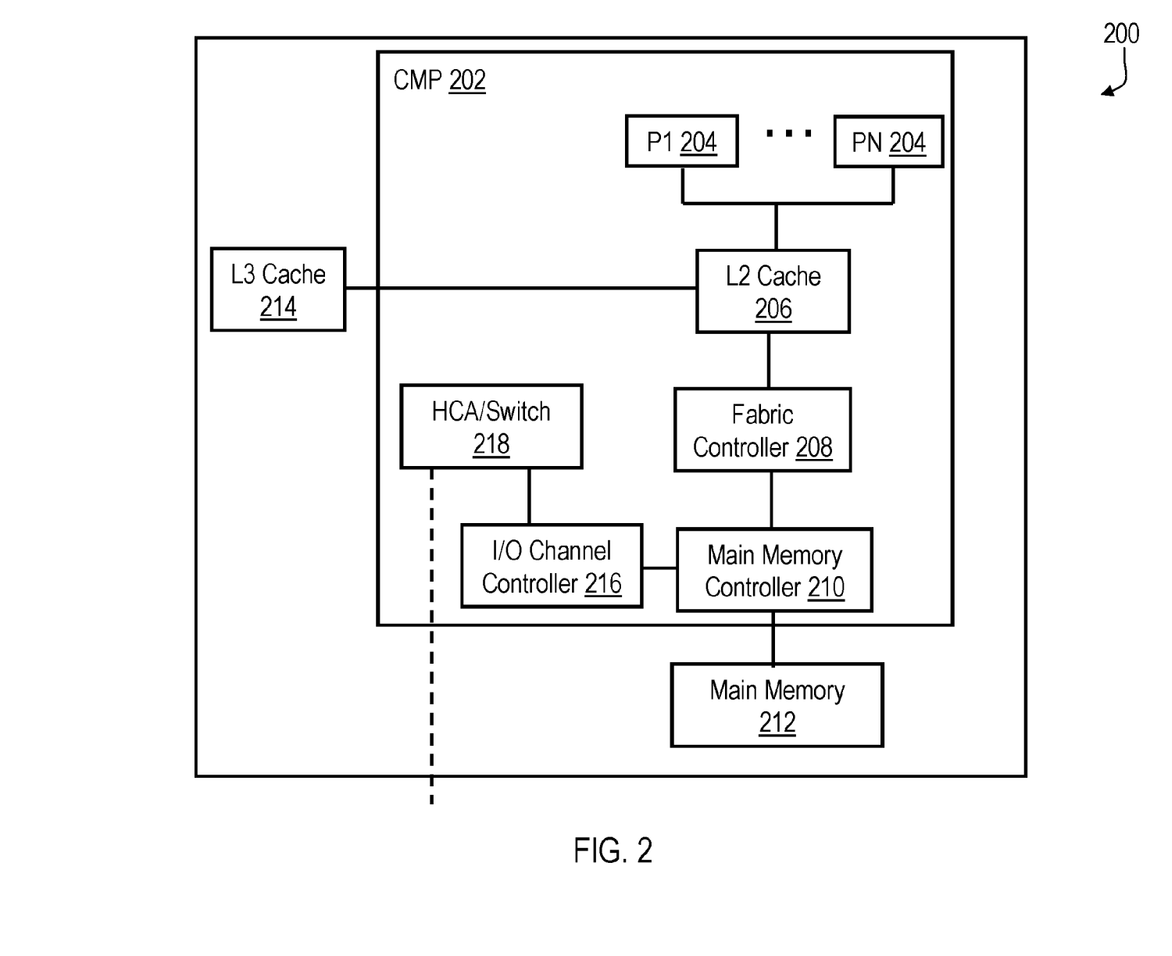
FIG. 2 is a diagram of a relevant portion of an exemplary symmetric multiprocessor (SMP) data processing system included in one of the nodes of FIG. 1, according to an embodiment of the present disclosure.

With reference to FIG. 2, each of the nodes N1-N18 of FIG. 1 may include a processor system, such as data processing system 200. As is illustrated, data processing system 200 includes one or more chip-level multiprocessors (CMPs) 202 (only one of which is illustrated in FIG. 2), each of which includes multiple (e.g., eight) processors 204. Processors 204 may, for example, operate in a simultaneous multithreading (SMT) mode or a single thread (ST) mode. When processors 204 operate in the SMT mode, processors 204 may employ multiple separate instruction fetch address registers to store program counters for multiple threads.

In at least one embodiment, processors 204 each include a first level (L1) cache (not separately shown in FIG. 2) that is coupled to a shared second level (L2) cache 206, which is in turn coupled to a shared third level (L3) cache 214. The L1, L2, and L3 caches may be combined instruction and data caches or correspond to separate instruction and data caches. In the illustrated embodiment, L2 cache 206 is further coupled to a fabric controller 208 that is coupled to a main memory controller (e.g., included in a Northbridge) 210, which supports a main memory subsystem 212 that, in various embodiments, includes an application appropriate amount of volatile and non-volatile memory. In alternative embodiments, fabric controller 208 may be omitted and, in this case, L2 cache 206 may be directly connected to main memory controller 210.

Fabric controller 208, when implemented, facilitates communication between different CMPs and between processors 204 and memory subsystem 212 and, in this manner, functions as an interface. As is further shown in FIG. 2, main memory controller 210 is also coupled to an I/O channel controller (e.g., included in a Southbridge) 216, which is coupled to a host channel adapter (HCA)/switch block 218. HCA/switch block 218 includes an HCA and one or more switches that may be utilized to couple CMP 202 to CMPs in other nodes (e.g., I/O subsystem nodes and processor nodes) of HPC cluster 100.

Figure 3:
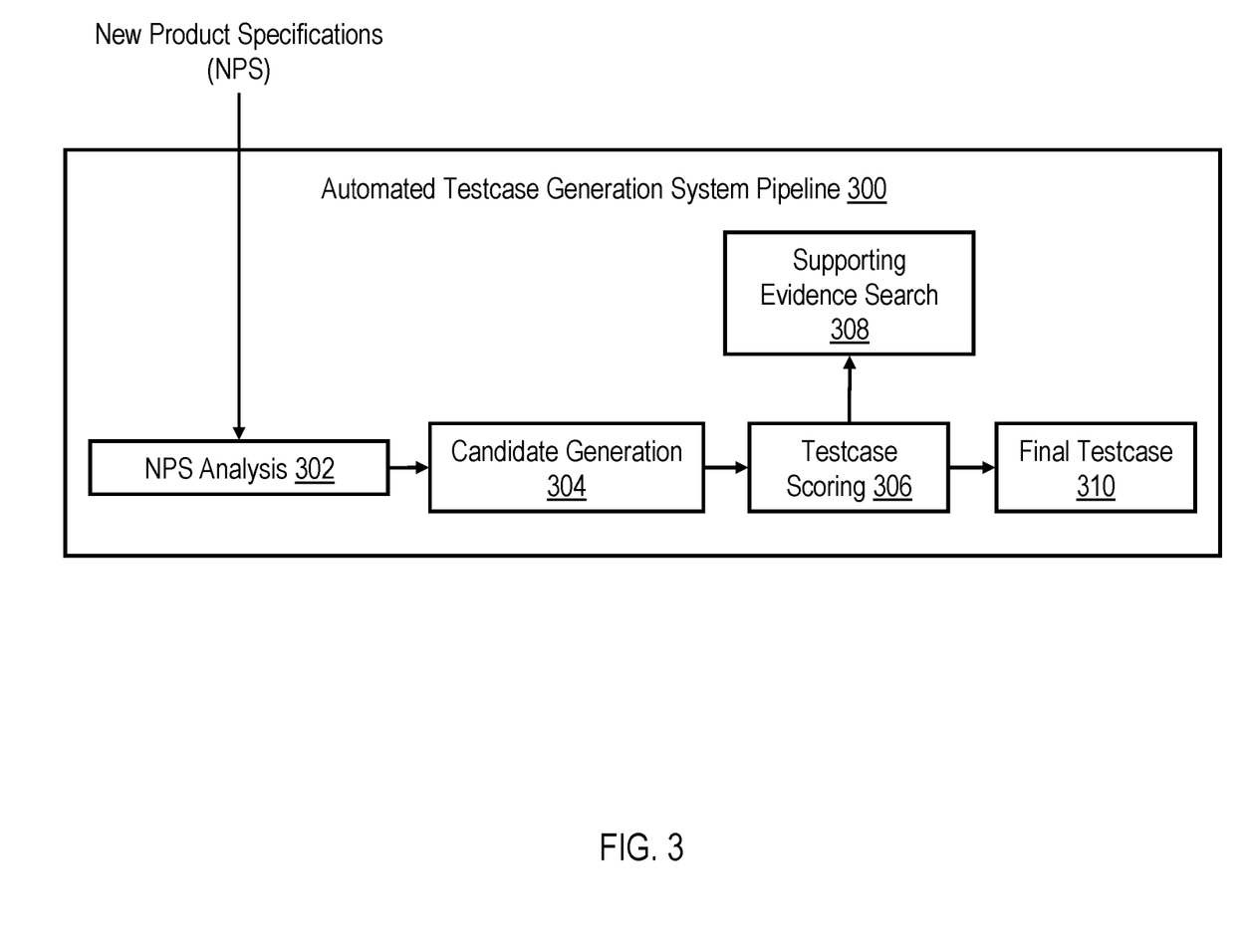
FIG. 3 depicts relevant components of an exemplary automated testcase generation system pipeline.

FIG. 3 illustrates relevant components of an automated testcase generation system pipeline 300 for an exemplary automated testcase generation system. As is illustrated in FIG. 3, a new product specification (NPS) analysis block 302 of pipeline 300 receives input (e.g., in the form of new product specifications) and generates an output representing its analysis of the input. It should be appreciated that original product specifications and testcases are required to have been previously loaded and acted upon by the system, as discussed above. A candidate generation block 304 of pipeline 300 receives the output from NPS analysis block 302 at an input and generates candidate testcases. The candidate testcases are provided to an input of a testcase scoring block 306, which is configured to initiate a supporting evidence search (by supporting evidence search block 308) in order to score the various generated testcases. The results of the testcase scoring are provided to a final testcase block 310, which is configured to provide a final testcase based on the scoring of the candidate testcases. It should be appreciated that blocks 302-310 may be implemented in program code executing on one or more processor cores or may be directly implemented in dedicated hardware (logic).

Figure 4:
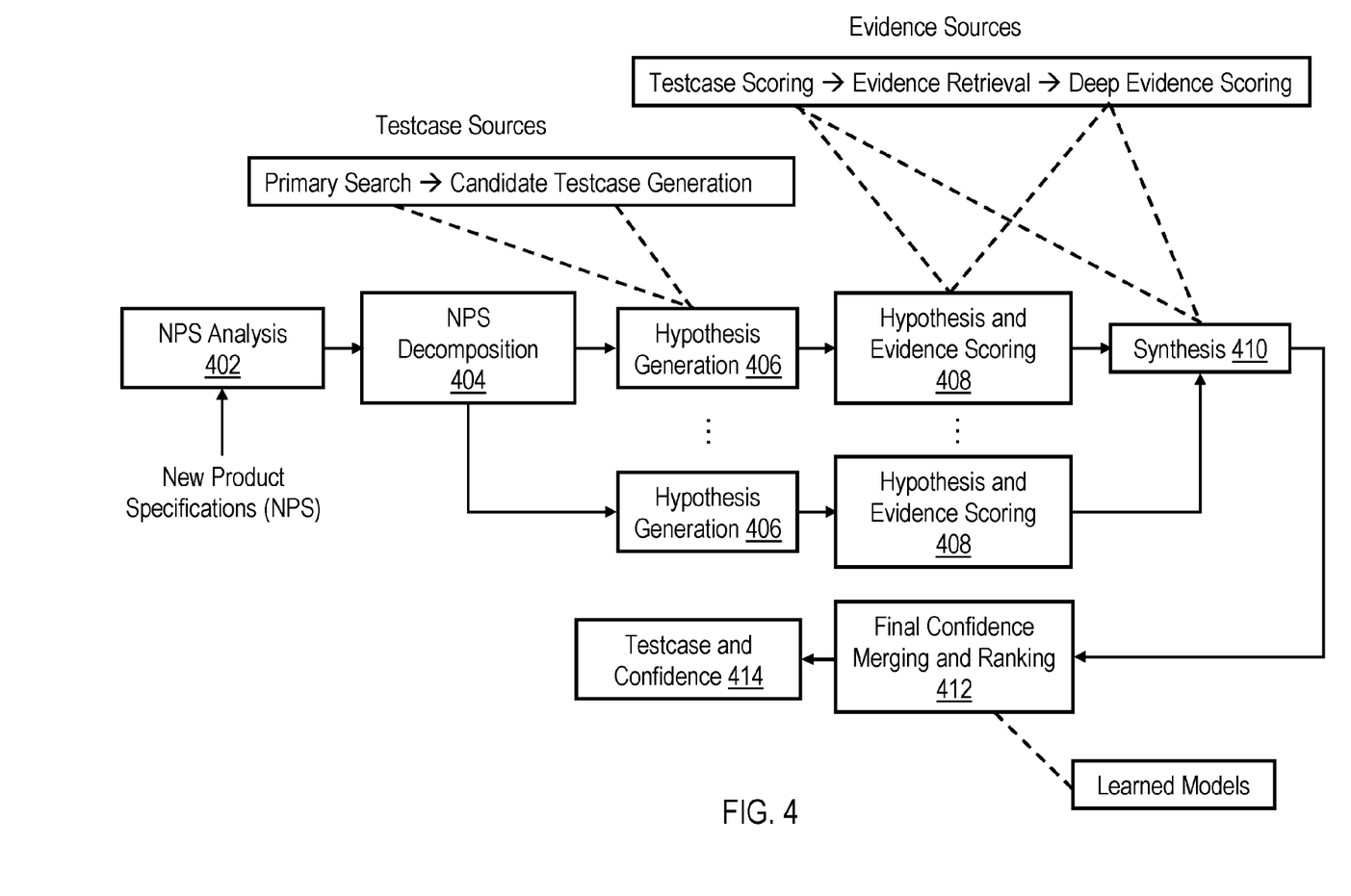
FIG. 4 depicts relevant components of the exemplary automated testcase generation system pipeline in additional detail.

FIG. 4 illustrates relevant components of exemplary automated testcase generation system pipeline 300 in additional detail. As is illustrated, NPS analysis block 402 receives an NPS. An output of block 402 is provided to an NPS decomposition block 404, which further analyzes the NPS to create one or more noun-verb pairings. Block 404 provides inputs to multiple hypothesis generation blocks 406, which perform parallel hypothesis generation. Hypothesis generation blocks 406 each perform a primary search, collect reference data from different structured and unstructured sources, and generate candidate testcases. For example, data generated by hypothesis 'i' may be referenced as 'D_i', and data generated by hypothesis 'j' may be referenced as 'D_j'. The data 'D_i' and 'D_j' may be the same data, completely different data, or may include overlapping data.

As one example, an automated testcase generation system may be configured, according to the present disclosure, to: receive an NPS; create 'N' hypotheses (1 . . . N) to locate candidate testcases (e.g., N=10) in the existing testcases; and load information for each hypothesis 'i' on which to operate into a shared cache. For example, assuming a shared cache across all hypotheses, 1/Nth of the shared cache may be loaded with data for each hypothesis to operate on. The automated testcase generation system may be further configured to execute the 'N' hypotheses to return 'M' candidate testcases (in this case, each hypothesis generates one or more candidate testcases). For example, the notation 'ANS_i' may be employed to denote a set of candidate testcases generated by hypothesis 'i'. In various embodiments, hypothesis and evidence scoring for each hypothesis is initiated in hypothesis and evidence scoring blocks 408. That is, the automated testcases system is further configured to score all the candidate testcases using hypothesis and evidence scoring techniques (e.g., providing 'M' scores for 'M' candidate testcases). In synthesis block 410 the QA system evaluates the candidate testcases with the highest scores and determines which hypotheses generated the highest scores.

Following block 410, the automated testcase generation system initiates final confidence merging and ranking in block 412. Finally, in block 414, the automated testcase generation system provides a testcase (and may provide a confidence score) for the new feature in the new specification. Assuming, for example, the candidate testcases 'j', 'k', and 'l' have the highest scores, a determination may then be made as to which of the hypotheses generated the best candidate testcases. As one example, assume that hypotheses 'c' and 'd' generated the best candidate testcases 'j', 'k', and 'l'. The automated testcase generation system may then upload additional data required by hypotheses 'c' and 'd' into the cache and unload data used by other hypotheses from the cache. According to the present disclosure, the priority of what data is uploaded is relative to candidate testcase scores (as such, hypotheses producing lower scores have less associated data in cache). When a new specification is received, the above-described process is repeated. If the hypotheses 'c' and 'd' again produce best candidate testcases, the automated testcase generation system loads more data that is relevant to the hypotheses 'c' and 'd' into the cache and unloads other data.

If, on the other hand, hypotheses 'h' and 'g' produce the best candidate testcases, the automated testcase generation system may load more data relevant to the hypotheses 'h' and 'g' into the cache and unload other data. It should be appreciated that, at this point, hypotheses 'c' and 'd' probably still have more data in the cache than other hypotheses, as more relevant data was previously loaded into the cache for the hypotheses 'c' and 'd'. According to the present disclosure, the overall process repeats in the above-described manner by basically maintaining data in the cache that evidence scoring indicates is most useful. The disclosed process may be unique to an automated testcase generation system when a cache controller is coupled directly to an evidence scoring mechanism of the automated testcase generation system.

Figure 5:
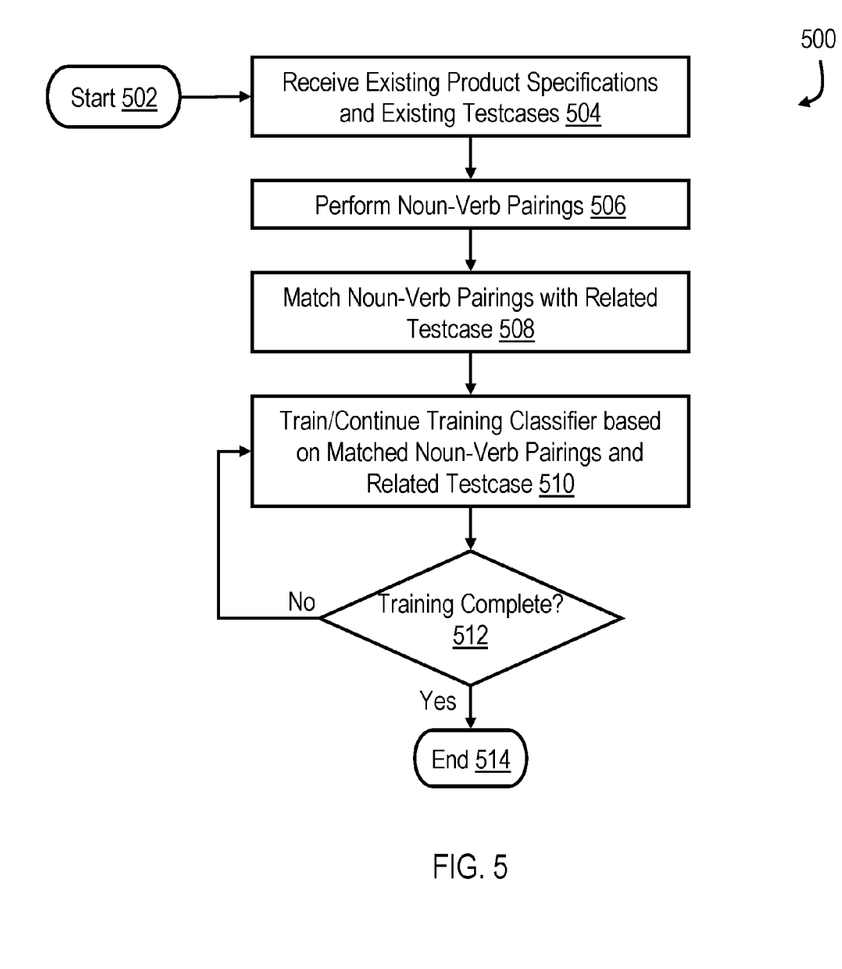
FIG. 5 is a flowchart of an exemplary process for associating noun-verb pairings with related testcases, according to an embodiment of the present disclosure.

With reference to FIG. 5 a process 500 for associating noun-verb pairings with related testcases, according to aspects of the present disclosure, is illustrated. Process 500 may be implemented, for example, through the execution of one or more program modules (that are, for example, configured to function as a testcase training engine) by one or more processors 204 of data processing system 200.

Process 500 is initiated in block 502 and then proceeds to block 504, which illustrates a data processing system 200 receiving as inputs one or more existing product specifications and one or more existing testcases that test features defined in the product specifications. Next, in block 506, data processing system 200 performs noun-verb parings for nouns and verbs located in the existing product specifications.

Next, in block 508, data processing system 200 matches the noun-verb pairings with related ones of the testcases. Then, control transfers from block 508 to block 510, where data processing system 200 trains or continues to train a machine learning application classifier based on the matched noun-verb pairings and related testcases. Next, in decision block 512, data processing system 200 determines whether training is complete. If an additional noun-verb pairing and related testcase are located (e.g., within a predetermined time period), training is not complete and control transfers from block 512 to block 510. If an additional noun-verb pairing and related testcase are not located (e.g., within the predetermined time period), control transfers from block 512 to block 514, where process 500 terminates until additional existing product specifications and related existing testcases are received for classifier training.

Figure 6:
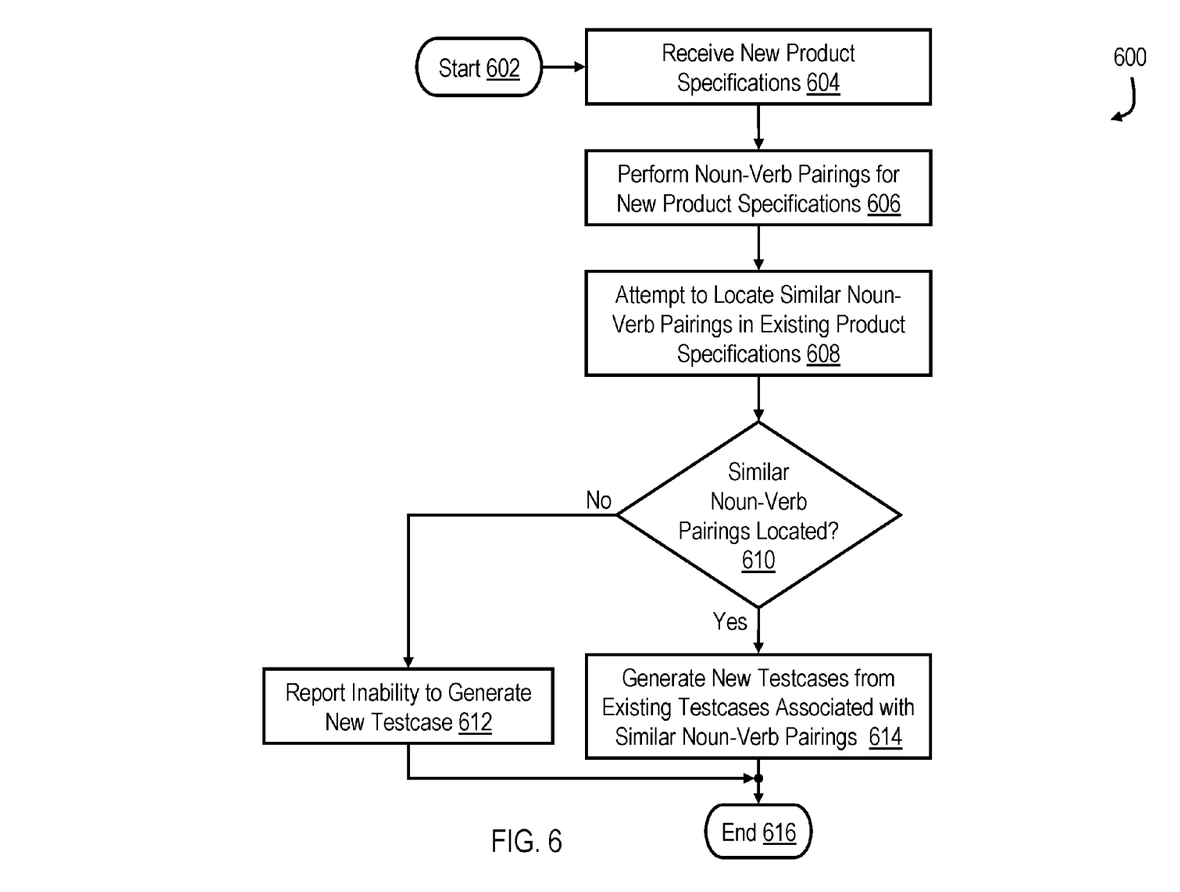
FIG. 6 is a flowchart of an exemplary process for generating new testcases from existing testcases that are associated with similar noun-verb pairings, according to an embodiment of the present disclosure.

With reference to FIG. 6 a process 600 for generating new testcases for new features specified in a new product specification, according to aspects of the present disclosure, is illustrated. Process 600 may be implemented, for example, through the execution of one or more program modules (that are, for example, configured to function as a testcase generation engine) by one or more processors 204 of data processing system 200.

Process 600 begins at block 602 and then proceeds to block 604, which depicts a data processing system 200 receiving as input one or more new product specifications for an existing product whose original product specifications and original testcases have already been loaded into and processed by data processing system 200.

Next, in block 606, data processing system 200 performs noun-verb parings for nouns and verbs located in the new product specifications Then, control transfers from block 606 to block 608, where data processing system 200 attempts to located similar noun-verb pairings in the existing product specifications. Next, in decision block 610, data processing system 200 determines whether similar noun-verb pairings were located in the existing product specifications. If similar noun-verb pairings are not located in the existing product specifications, control transfers from block 610 to block 612, where an inability to generate a new testcase is reported to a user of data processing system 200. From block 612 control transfers to block 616 where process 600 terminates. If similar noun-verb pairings are located in the existing product specifications in block 610, control transfers from block 610 to block 614. In block 614, data processing system 200 generates one or more new testcases from the existing testcases that are associated with the similar noun-verb pairings. From block 614 control transfers to block 616 where process 600 terminates.

Accordingly, techniques have been disclosed herein that advantageously facilitate generating new testcases while generally reducing the manual effort required to produce new testcases.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of generating testcases, comprising:
   receiving, at a data processing system, a new product specification for an application;
   performing, by the data processing system, a new noun-verb pairing on the new product specification;
   attempting to locate, by the data processing system, a similar noun-verb pairing, corresponding to the new noun-verb pairing, in a previous product specification for the application;
   in response to locating the similar noun-verb pairing in the previous product specification, generating, by the data processing system, a new testcase by modifying a previous testcase that is associated with the similar noun-verb pairing in the previous product specification;
   in response to not locating the similar noun-verb pairing in the previous product specification, indicating, by the data processing system, that the new testcase was not generated;
   loading, by the data processing system, the previous product specification and the previous testcase;
   performing, by the data processing system, natural language processing on the previous product specification to identify the similar noun-verb pairing in the previous product specification;
   matching, by the data processing system, the similar noun-verb pairing with the previous testcase; and
   training, by the data processing system, a classifier using the similar noun-verb pairing and the previous testcase.

2. The method of claim 1, wherein the classifier is utilized to locate the previous testcase.

3. The method of claim 2, wherein the classifier is a Bayesian classifier.

4. The method of claim 1, wherein the new testcase corresponds to automated test code for a graphical user interface (GUI) element of the application.

5. The method of claim 1, further comprising:
loading additional information for a revised version of the application into the data processing system; and
generating one or more additional new testcases based on differences between the additional information and the new product specification.

6. The method of claim 1, further comprising:
executing the new testcase to test a new feature of the application defined in the new product specification.

* * * * *